Oct. 12, 1965  W. H. PRINCE  3,211,130
BIRD FEEDERS

Filed Feb. 4, 1964  3 Sheets-Sheet 1

INVENTOR.
William Herbert Prince
BY his attorneys
Howson and Howson

Oct. 12, 1965 W. H. PRINCE 3,211,130
BIRD FEEDERS
Filed Feb. 4, 1964 3 Sheets-Sheet 2
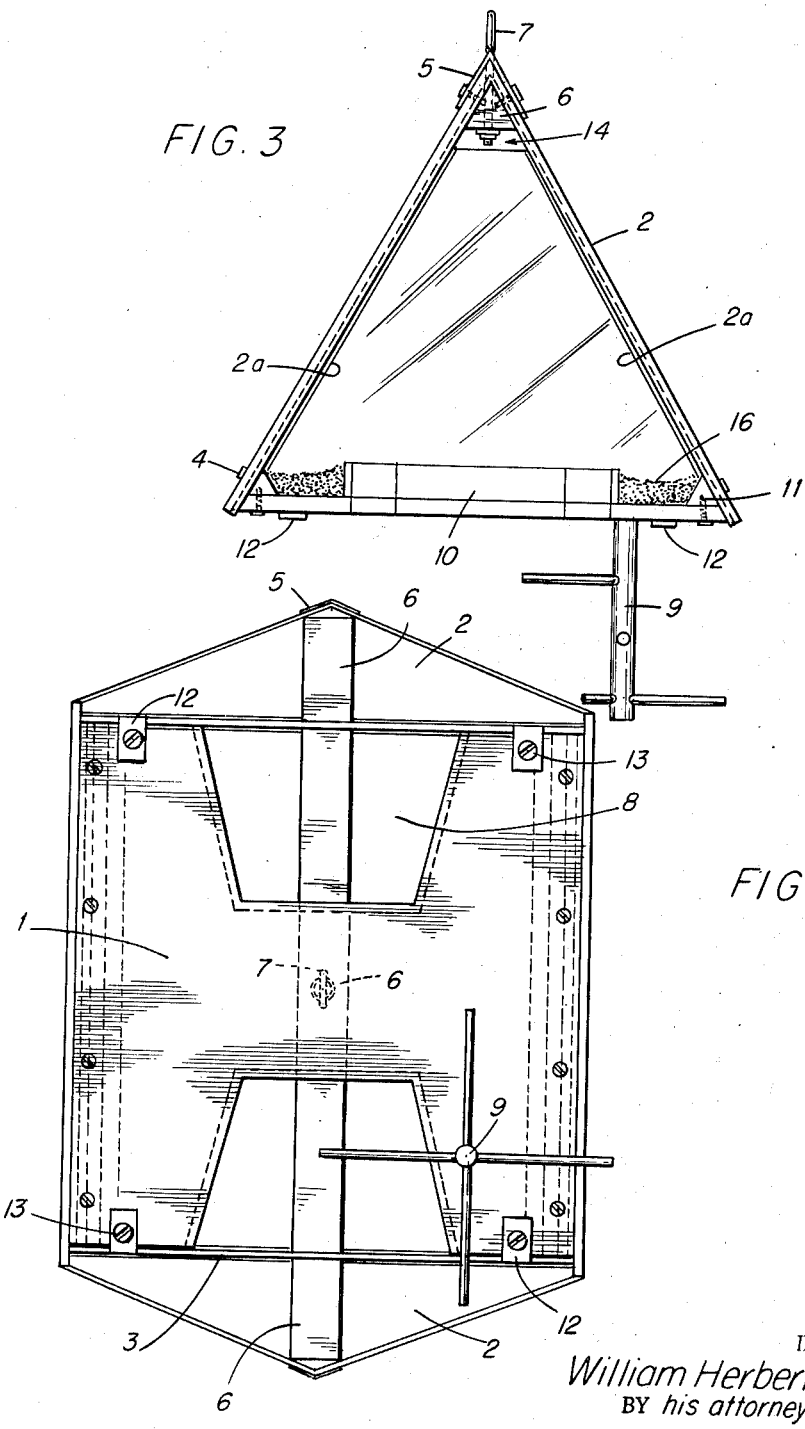
INVENTOR.
William Herbert Prince
BY his attorneys
Howson and Howson Oct. 12, 1965 W. H. PRINCE 3,211,130
BIRD FEEDERS
Filed Feb. 4, 1964 3 Sheets-Sheet 3

INVENTOR.
*William Herbert Prince*
BY his attorneys

*Howson and Howson*

3,211,130
BIRD FEEDERS
William Herbert Prince, P.O. Box 621, Gatlinburg, Tenn.
Filed Feb. 4, 1964, Ser. No. 342,448
2 Claims. (Cl. 119—51)

This invention relates to bird feeders and more particularly to the type of feeder which is wholly enclosed against the weather and can be suspended from its top.

Using the open or hopper-type bird feeders available on the market one cannot readily maintain feed placed therein dry and available during various adverse weather conditions. During freezing weather, for example, snow and rain often collect and solidly plug up these feeders and cause the feed to rot. Under these conditions, feed is useless and unavailable to birds at times when they most need it. Partially enclosed feeders oriented by force of wind to present an open side to leeward or calm are not entirely satisfactory, for rain or snow is often driven into the open side by slight movements of air that lack sufficient energy to properly orient the feeder.

Another serious defect, common to all these feeders, has been the fact that large birds, such as jay, grosbeak, starling, dove, and pigeon regularly clear out so much seed from the feeders that the smaller birds, e.g., chickadee, tufted titmouse, ruby crowned kinglet, wren, cardinal, are unable to obtain their share.

It is an object of this invention to provide a bird feeder that overcomes the drawback and disadvantage recited above.

A further object of the present invention is to provide a bird feeder that maintains feed dry during all weather conditions, provides access to the feed, which access remains open throughout all weather conditions, and which restricts use of the feeder to smaller birds.

Other objects will become apparent later in the specification.

The invention is based upon the use of a weathertight feeder having a naturally lighted interior, which station permits ingress and egress by birds exclusively through the base or bottom of the station. Birds can enter and leave the station only through and from underneath. Large birds can be entirely excluded from the interior of the station.

Having reference to the drawings:

FIG. 3 is a front end view in elevation of the embodiment of FIG. 1.

FIG. 4 is an inverted view of the embodiment of FIG. 1 as seen from the bottom.

Figure 1:
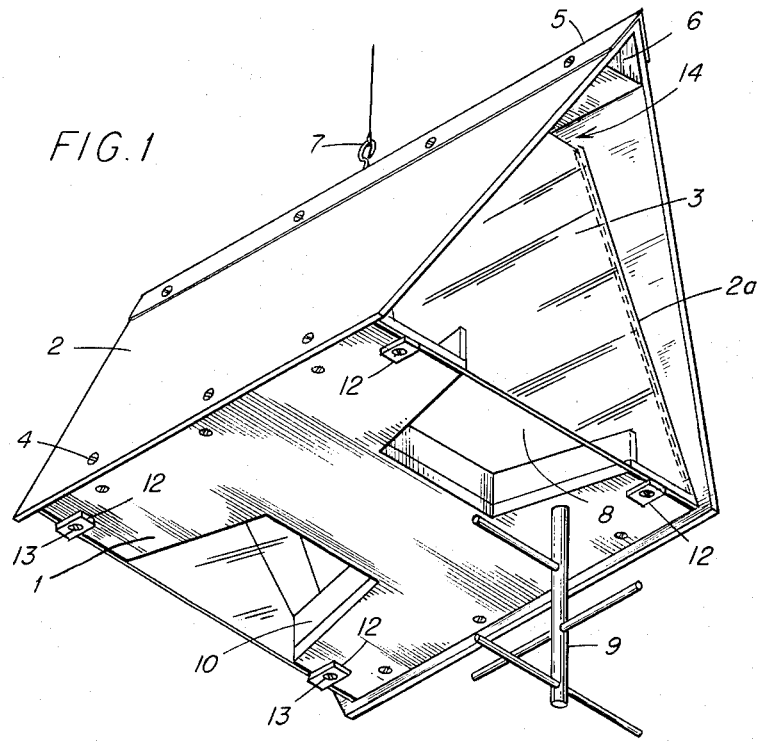
FIG. 1 is a perspective view of the chalet or preferred embodiment of the station feeder showing the underneath access feature and the transparent end panels of the invention.
Figure 2:
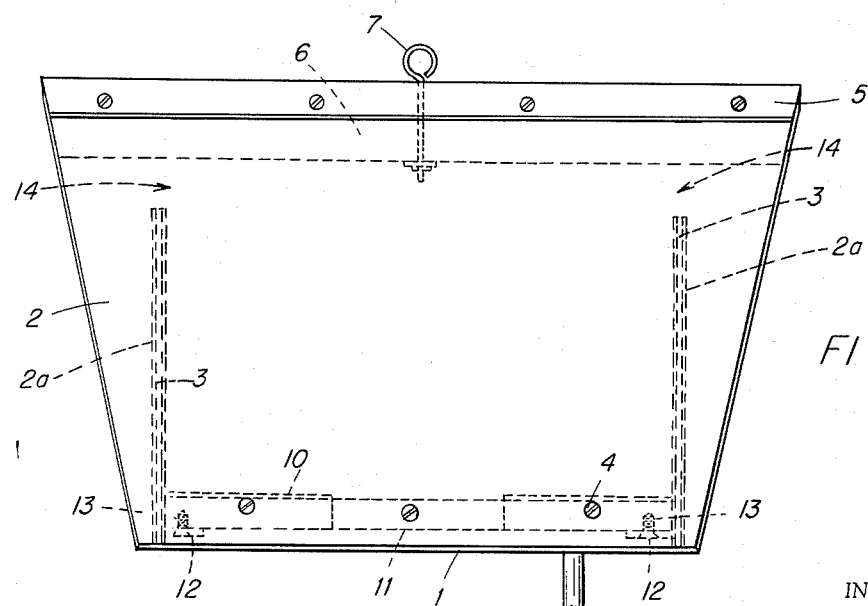
FIG. 2 is a side view in elevation of the embodiment of FIG. 1.

In the preferred embodiment of the invention shown in FIGS. 1 to 4 there is a base 1 which may be made of ⅜" weatherproof plywood. To this base are attached opaque panels or sloping side walls 2 of, for example, ¼" weatherproof plywood. The angle of slope is not critical although angles which measure less than between 45° and 50° from the floor or base 1 tend to create structures having inconveniently long, low roof-lines that unnecessarily restrict freedom of movement of birds within the feeder. The sloping side walls 2 join together to form a ridge line at their edges which are most remote from the base. Transparent, upright end panels 3 are also mounted to the base. These are triangular in shape and are interfitted with the walls 2 to form the cover structure or enclosure. While any transparent material may be used, the trademarked material Plexiglas or its equivalent is light, safe and easy to shape. It has been found that attachment of the side walls to the base by screws 4 and interfitting the transparent end panels with the opaque side walls through use of channels in or guides 2a on the side walls provides a particularly strong and weathertight enclosure. A cap or ridge strip 5 that locks by screws 4 into the opaque side walls is installed along the length of the ridge to enhance the structural rigidity and weathertight qualities of the enclosure.

An eyebolt hanger block 6 is fixedly attached within the feeder. This block serves to support an eyebolt hanger 7 which protrudes through said block, and through the ridge strip 5, for suspension of the feeder from above. This block also serves to receive the screws 4 used to attach the ridge strip to the side walls 2.

Openings 8 in the base 1 of the feeder provide the only means by which birds can get into the interior of the station. With regard to the precise number or arrangement of the openings, it has been observed that traffic into and from the feeder is expedited by having one opening in each end or at opposite points of the base of the feeder. Means are provided adjacent the openings to facilitate ingress by birds seeking to use the feeder. The apertures may, alternatively, be located along any edge of the sides of the base. The assist means or perch could then depend from any conventional location relative to the openings, including centrally from the base. This arrangement also provides smooth and fast flow of traffic.

The particular ingress assist means used in the chalet or preferred embodiment shown in FIGS. 1–4 is a spiral peg ladder 9 depending from the base 1 at a point conveniently adjacent to the aperture used for ingress. Combing or rail 10 is mounted around the upper and inside edge of each of the openings within the feeder. Side wall spacer blocks 11 are mounted by screws 4 within the feeder along the lines formed by the juncture of the sloping side walls 2 and the base 1. The floor or upper surface of the base, within the feeder, serves as a feed platform. The combing 10 prevents feed on the said platform from falling out through the openings. The spacer blocks 11 also prevent feed from becoming packed inaccessibly away in the vertices formed by the juncture of the base and the side walls. Latches 12 and screws 13 hold the plastic end panels 3 to the base 1. The latches underlie the said panels and can be loosened if it is necessary to remove the panels. This saves having to bore holes in the plastic.

Experience has shown that occasionally insects fly into the feeder through the holes in the base but cannot find their way out through these holes. I have therefore provided an insect escape hole 14 at the top of each of the transparent end panels 3 in the embodiment of FIGS. 1 to 4.

The transparent end walls 3 provide natural interior lighting and are essential in this regard. Birds will not enter an enclosure from beneath and through the base unless the inside has some light. On the other hand, and contrary to opinions expressed by naturalists and others who are familiar with birds, experimental use of feeders incorporating the invention demonstrates that birds readily adapt to and use the feeder with its transparent end walls, and effect ingress and egress from underneath with ease and speed.

Use of the feeder can be restricted to birds smaller in size than those of the jay family, grosbeak, starling, dove and pigeon by use of appropriately sized openings. This construction ensures that the smaller birds: chickadees, tufted titmice, ruby crowned kinglets, wrens, cardinals, and the like, will have opportunity to feed without the larger birds being able to reach the feed and consume it, leaving none for the smaller birds.

Figure 5:
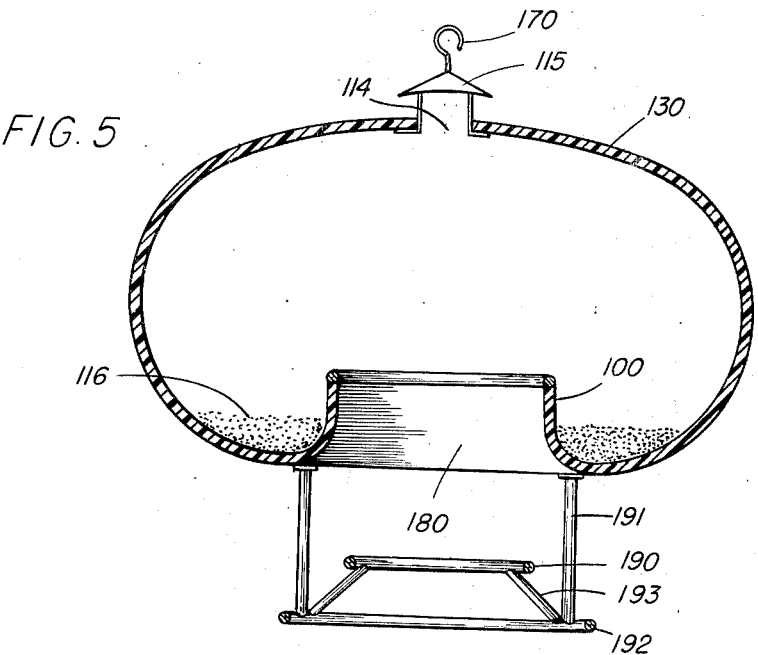
FIG. 5 is a side view in section taken along the line 5—5 of FIG. 6 showing an alternative or round embodiment of the invention, known as the bubble.
Figure 6:
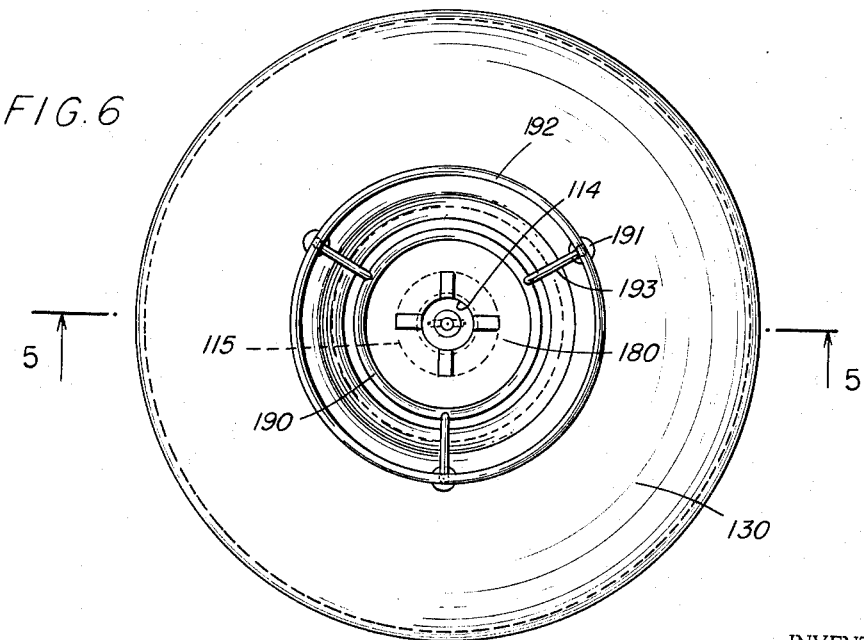
FIG. 6 is a view of this round embodiment of the invention, seen from the bottom of FIG. 5.

An alternative or round embodiment of the invention is shown by FIGS. 5 and 6. This can be called the bubble embodiment and can be most readily constructed either all in plastic or partly of plastic and partly of metal. The structure incorporates the underneath and restricted access features and the natural lighting features of the preferred chalet embodiment of FIGS. 1 to 4. There is an enclosure 130 made at least partly of transparent plastic material, such as Plexiglas. An eyebolt hanger 170 protrudes through the top thereof for suspension of the feeder from the top. A central opening 180 in the underside or bottom of the feeder provides birds with the necessary means of communication with the interior. Upstanding combing 100 serves to confine food placed within the feeder and keep it from falling through the opening 180. Depending from the bottom of the single and central bottom opening 180 of this embodiment are columns 191 supporting a lower ring 192 the size of the opening. Short angle rods 193 extend upwardly and inwardly to support a ring perch 190 for the birds to assist their ingress to the interior of the feeder. The perch shown is slightly smaller than the opening but birds can get out through it if they are of the size for which the feeder is constructed. Birds adapt to this embodiment and use it as readily and frequently as the preferred chalet embodiment.

Height from feeder to ground is important, with regard to access by rodents. Rodent-proofing of the units can be most easily accomplished if the ground to base-structure measurement is such that rodents, including squirrels, cannot jump to grasp the access assist means or the rims of the apertures (the combing) of the feeders.

In the bubble embodiment of FIGS. 5 and 6 the insect escape hole is numbered 114 and is located at the center of the plastic enclosure just under the eyebolt hanger 170. This hanger has a roof 115 to prevent rain getting in and reaching the feed 116.

It will be seen from the foregoing specification that the invention provides a bird feeder which protects the feed within its structure through all weather conditions; a feeder which can be used by birds as a shelter during all weather conditions. It is sturdy, and is readily used by smaller birds while not being utilizable by larger birds.

The invention is not intended to be limited to the precise embodiments hereinabove described or hereinafter claimed. Numerous modifications may be made without departing from the spirit of the invention. For example, transparent side walls may be used in the preferred chalet embodiment, instead of opaque side walls. Nor must the chalet configuration necessarily be adhered to, nor for that matter the bubble shape of the alternative embodiment. Modification of the apertures is considered to be a step well within the ordinary skill of workers in the art. Substitution of fixed or removable feed devices for the feed platform formed by the base of the station is also considered to be an alternative construction within the scope of the invention. Other changes which may become apparent to workers ordinarily skilled in the art are also considered to be within the ambit of the invention and the appended claims setting forth the same.

What is claimed is:

1. A bird feeder comprising a base, a hollow closed roof structure enclosing the base having transparent end panels that admit light to the space between the base and roof structure which forms the interior of the feeder, and opaque side walls, said walls being of A-frame shape, and a ridge strip that locks the opaque walls at their mutual juncture, there being openings in the base permitting admission or egress of birds below the base, ingress assist means associated with at least one of the openings, in combination with upstanding combing along edges of the openings in the base to prevent the feed falling through the openings, spacer blocks on the base structure where the opaque panels join the base, and means secured to the ridge strip and protruding therethrough to facilitate suspending the feeder clear above the ground; whereby bird feed placed within the feeder is maintained dry, birds enter and leave the feeder only through the base structure, from beneath, and adequate natural light is provided within the feeder.

2. A bird feeder comprising a base having at least one opening therein for the admission of birds from below, the opening being sized to restrict entry to birds of less than a predetermined size, in combination with a complete all weather enclosure over the base, said enclosure having means for admitting light to the interior, and in which the base comprises a feed platform and the opening comes up through the platform, an upstanding feed confining rail around the opening, and means on the feeder for mounting the same other than from below.

References Cited by the Examiner

UNITED STATES PATENTS

| D. 195,628 | 7/63 | Andreae | D31—2 |
| 2,430,541 | 11/47 | Thatcher | 119—51 |
| 2,887,987 | 5/59 | Fitzgerald et al. | 119—23 |
| 3,086,499 | 4/63 | Dilley | 119—51 |
| 3,089,461 | 5/63 | Dunn | 119—51 |
| 3,104,649 | 9/63 | Slaven | 119—51 |

FOREIGN PATENTS

| 697,238 | 10/40 | Germany. |
| 339,680 | 12/30 | Great Britain. |

SAMUEL KOREN, *Primary Examiner.*

ALDRICH F. MEDBERY, *Examiner.*